(12) United States Patent  (10) Patent No.: US 7,213,369 B2
Freeman  (45) Date of Patent: May 8, 2007

(54) AUTOMATIC DOOR CONTROL SYSTEM (76) Inventor: Brian Freeman, 29 Linwood Rd. N., Port Washington, NY (US) 11050

( * ) Notice: Subject to any disclaimer, the term of this patent is extended or adjusted under 35 U.S.C. 154(b) by 298 days.

(21) Appl. No.: 10/722,999

(22) Filed: Nov. 24, 2003

(65) Prior Publication Data

US 2004/0103584 A1 Jun. 3, 2004

Related U.S. Application Data (60) Provisional application No. 60/428,471, filed on Nov. 22, 2002.

(51) Int. Cl.
E05F 11/00 (2006.01)
(52) U.S. Cl. ........................................................ 49/358
(58) Field of Classification Search .................. 49/276, 49/333, 334, 364, 358
See application file for complete search history.

(56) References Cited

U.S. PATENT DOCUMENTS

| 2,827,284 | A | * | 3/1958 | Bunzl | 49/32 |
| 4,183,177 | A | * | 1/1980 | Kurdziel | 49/25 |
| 4,911,508 | A | | 3/1990 | Tillman | 312/319 |
| 5,138,743 | A | | 8/1992 | Hoffman | 16/303 |
| 5,522,656 | A | | 6/1996 | Jenkins | 292/79 |
| 5,579,606 | A | | 12/1996 | Kim | 49/386 |
| 5,988,709 | A | | 11/1999 | Lee et al. | 292/199 |
| 6,061,964 | A | * | 5/2000 | Arnell et al. | 49/359 |
| 6,230,137 | B1 | | 5/2001 | Has et al. | 704/275 |
| 6,270,175 | B1 | | 8/2001 | Sfeir | 312/319.9 |
| 6,338,536 | B1 | * | 1/2002 | Ueno et al. | 312/405 |
| 6,811,236 | B1 | * | 11/2004 | Spong et al. | 312/405 |
| 2005/0091338 | A1 | * | 4/2005 | de la Huerga | 709/217 |

* cited by examiner

Primary Examiner—Jerry Redman
(74) Attorney, Agent, or Firm—Brooks Kushman P.C.

(57) ABSTRACT

The present invention provides an automatic door control system that includes a door, a control module assembly, and a drive train assembly. The control module assembly is coupled to the door. The drive train assembly is coupled to the control module assembly, where the drive train assembly is configured to receive a signal from the control module assembly to easily move the door, where the drive train assembly exerts a force to move the door.

10 Claims, 7 Drawing Sheets

AUTOMATIC DOOR CONTROL SYSTEM

CROSS-REFERENCE

This application claims priority to provisional application entitled "Automatic Refrigerator Door Control System", which was a filed Nov. 22, 2002 and has an application No. of 60/428,471, which is hereby incorporated by reference.

FIELD OF THE INVENTION

This invention relates to a door opening/closing apparatus, which facilitates the easy opening and closing of a door.

BACKGROUND OF THE INVENTION

Generally, people use their hands to open and close doors. The typical doors that may be opened and closed are car doors, house doors, refrigerator doors etc. These standard doors require a certain amount of physical strength to open and close them so some elderly and handicapped people may not be able to easily open and close them. In addition, if a person has a lot of groceries it is cumbersome for her to open the doors and hold the groceries at the same time.

There were several patents developed to address the problem of opening and closing the doors, such as U.S. Pat. Nos. 5,988,709 and 5,522,656. The inventions described in these patents enable people to easily use their hands to open and close doors by using gears, cams, springs and mechanical linkage to aid in door movement. However, these inventions were not useful for elderly or handicapped people that could not use their hands to open and close the doors.

Next, there were several U.S. Pat. Nos. 6,270,175 and 4,911,508 developed that did not require the use of hands to open and close doors. Nevertheless, there were still problems with these inventions because they required a user to utilize his feet to open and close the doors, which was not useful to those who couldn't use their feet.

Further, there was another U.S. Pat. No. 6,230,137 that was developed that did not require the use of hands or feet to open and close the door. However, this invention does not simply and efficiently open and close a door.

Therefore, there is a need for a device that enables a user to effortlessly open and close a door across a surface while expending a minimum amount of energy.

BRIEF SUMMARY OF THE INVENTION

The present invention has been accomplished in view of the above-mentioned technical background, and it is an object of the present invention to provide an automatic door control system that allows a user to easily move a door without expending a large amount of energy.

In a preferred embodiment of the invention, an automatic door control system includes a door, a control module assembly, and a drive train assembly. The control module assembly is coupled to the door. The drive train assembly is coupled to the control module assembly, where the drive train assembly is configured to receive a signal from the control module assembly to easily move the door, where the drive train assembly exerts a force to move the door.

In another preferred embodiment of the invention, method for moving a door across a surface is disclosed. A command is sent to an automatic door control system, then the command is analyzed and compared with databases at the automatic door control system to determine if there is a match between the command and the databases. If there is a match between the command and the databases, then it will be determined based on a positional status of a door if the command can be performed. If the positional status of the door is such that the command can be performed, then a drive train assembly is activated in response to the command, where the drive train assembly applies a force to a wheel mounted on the drive train assembly to easily move the door.

BRIEF DESCRIPTION OF SEVERAL VIEWS OF THE DRAWINGS

These and other advantages of the present invention will become more apparent as the following description is read in conjunction with the accompanying drawings, wherein.

DETAILED DESCRIPTION OF THE INVENTION

The presently preferred embodiments of the invention are described with references to the drawings, where like components are identified with the same numerals. The descriptions of the preferred embodiments are exemplary and are not intended to limit the scope of the invention.

Figure 1:
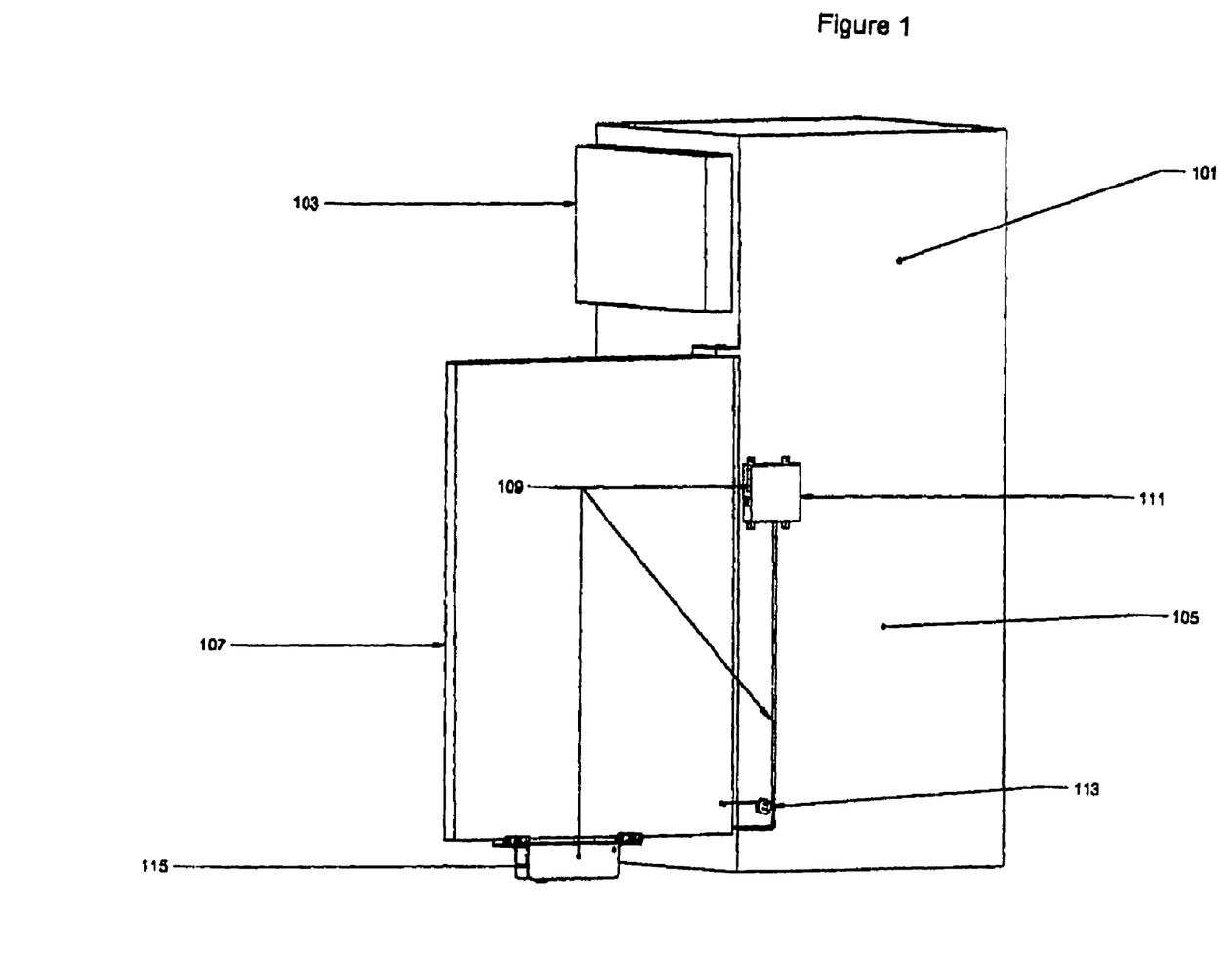
FIG. 1 illustrates an automatic door control system installed on a refrigerator in accordance with an embodiment of the invention.

FIG. 1 illustrates an automatic door control system installed on a refrigerator. The automatic door control system may also be referred to as an automatic refrigerator door control system. Refrigerator 100 is a standard refrigerator placed on any type of surface or floor, which includes a freezer compartment 101 affixed to a freezer door 103. The freezer compartment 101 includes the standard frozen products. In addition, the refrigerator 100 includes a refrigerator compartment 105 coupled to a refrigerator door 107, where the refrigerator compartment 105 holds the typical refrigerator products. The automatic refrigerator door control system 109 is coupled to the refrigerator door 107. In an alternative embodiment, the freezer door 103 and refrigerator door 107 may be combined into one door coupled to the automatic refrigerator door control system 109. In yet another alternative embodiment, the automatic refrigerator door control system 109 can be utilized on any door.

Refrigerator door control system 109 is utilized to easily open and close the refrigerator door 107 based on voice commands and sounds from a person. Alternatively, formatted command signals sent from another device and received at the automatic refrigerator door control system 109 to easily open and close the refrigerator door 107. The refrigerator door control system 109 includes a control module assembly 111, a door position indicator 113 and a drive train assembly 115. Preferably, the door position indicator 113 may be a draw wire transducer. Control module assembly 111, door position indicator 113 and the drive train assembly 115 are operatively connected to each other by a wire or any standard connection utilized to connect two or more devices.

In a preferred embodiment, a user will say a preset command that will be detected by the control module assembly 111, then the control module assembly 111 will send a signal through the wire connection to activate the drive train assembly 115 to easily open or close the refrigerator door 107. When the refrigerator door 107 is in motion the draw-wire transducer 113 receives a signal from the control module assembly 111 so that the draw-wire transducer 113 can indicate the status of the refrigerator door 107.

Figure 2:
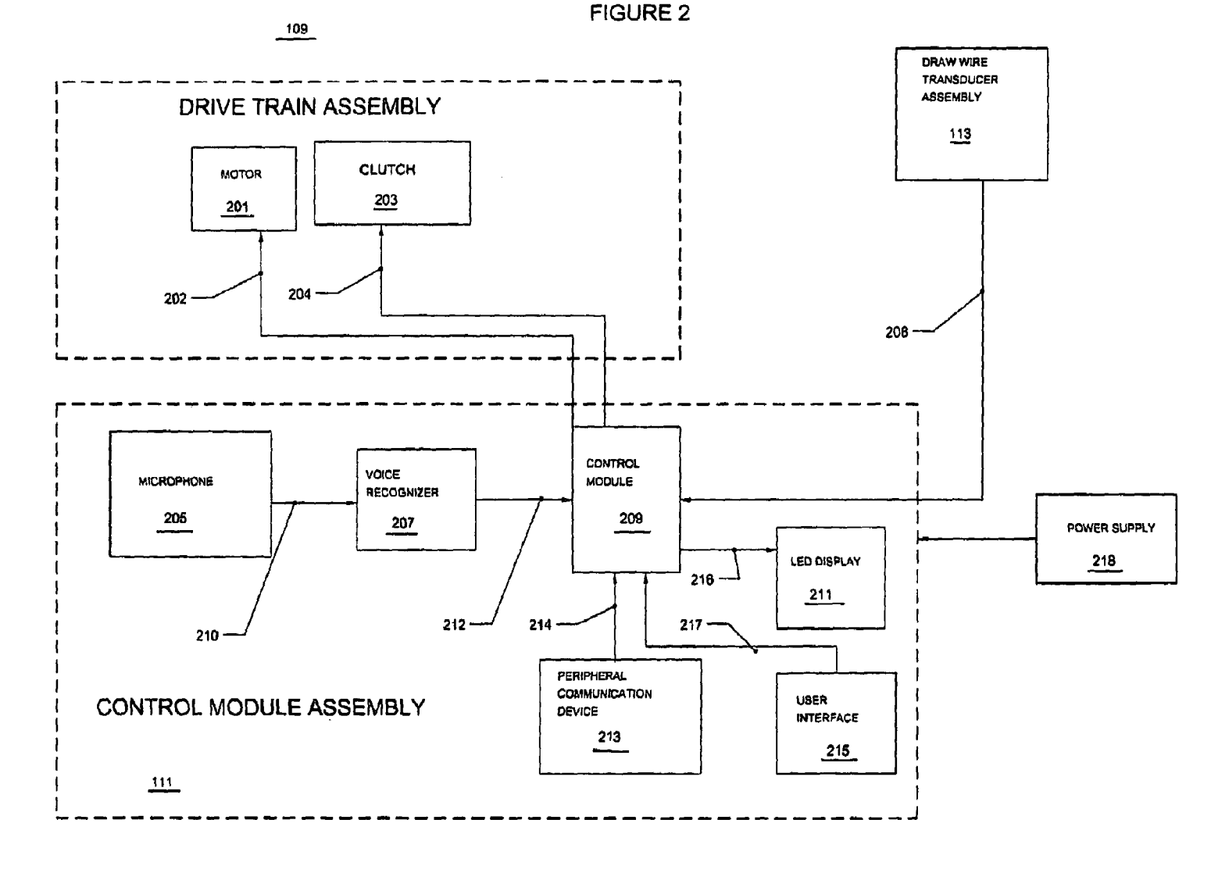
FIG. 2 depicts a control schematic of the automatic door control system of FIG. 1 in accordance with the invention.
Figure 3:
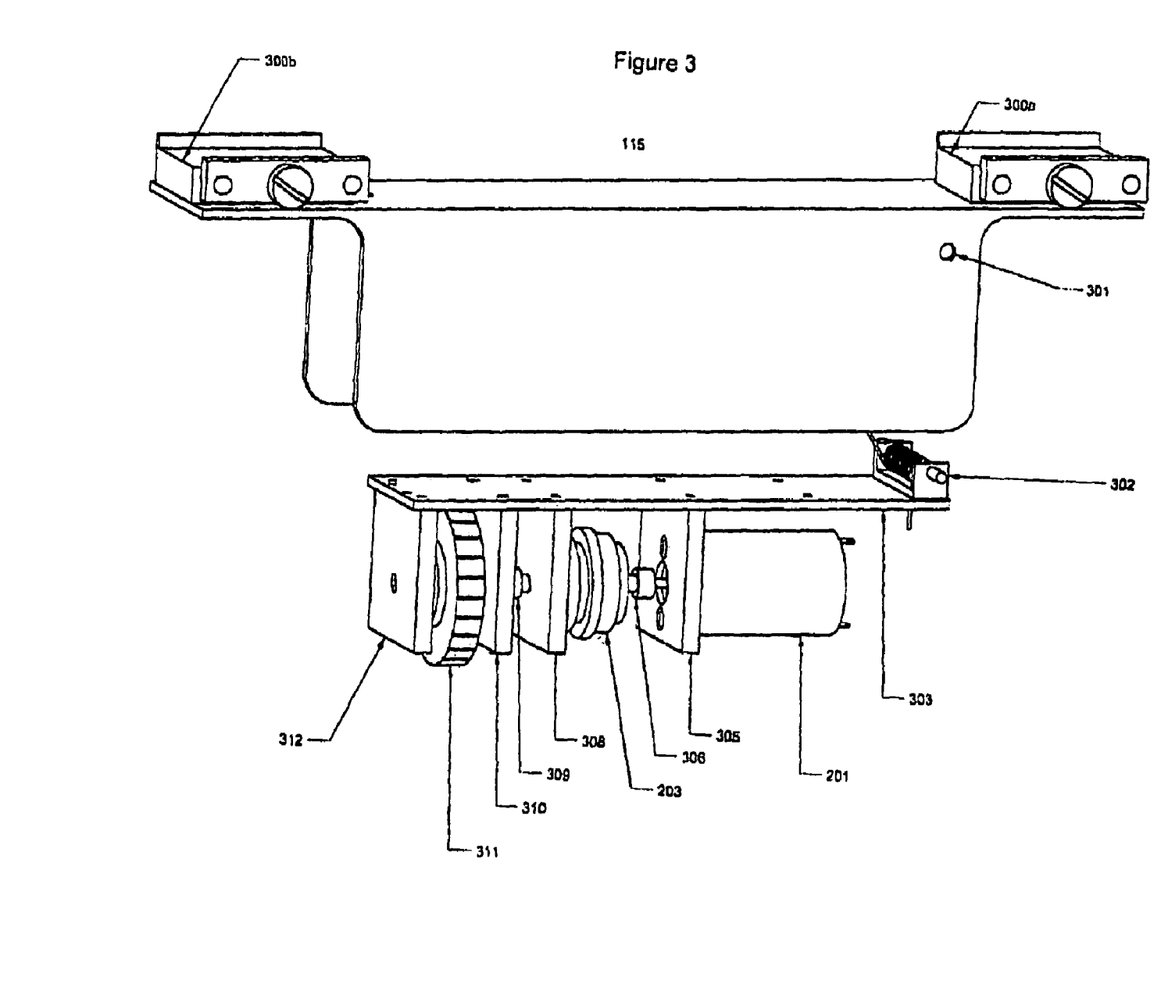
FIG. 3 illustrates an exploded view of a drive train assembly of the automatic door control system of FIG. 1 in accordance with the invention.

FIG. 2 is a control schematic of the automatic refrigerator door control system 109. As stated above, the automatic refrigerator door control system 109 includes: the drive train assembly 115 coupled to the control module assembly 111, which is coupled to the draw wire transducer 113. The drive train assembly 115 includes a motor 201 operatively connected to a clutch 203. Preferably, the motor 201 is a motor with an integrated gearbox. In yet another embodiment, the gear motor may be a gas motor. Alternatively, the motor 201 may be an electric motor, such as a direct current (DC) motor, alternating current (AC) motor etc. The power rating of the motor 201 should be sufficient to generate speed and torque, such as 20 lb-in to move a wheel 311 (FIG. 3) that repositions or swings the refrigerator door 107. The clutch 203 coupled to the motor 201 may be an electromagnetic clutch or a typical Dog clutch. The operative connection between the clutch 203 and the motor 201 may be any kind of mechanical connection such that the motor 201 can transmit a torque through the clutch 203 to the wheel 311 (FIG. 3). Motor 201 and the clutch 203 are operatively connected by standard wires 202 and 204 or connectors to the control module assembly 111.

Control module assembly 111 includes: a microphone 205, voice recognizer 207, control module 209, Light Emitting Diode (LED) display 211, peripheral communication device 213, user interface 215 and a power supply 218. Microphone 205 is operatively connected by a standard wire 210 to the voice recognizer 207. The voice recognizer includes a processor, such as a microprocessor or a digital signal processor. Voice recognizer 207 is operatively connected by a standard wire 212 to the control module 209. The control module 209 includes a processor that enables it to control the control module assembly 111 and the entire operation of the automatic refrigerator door control system 109. The control module 209 is adapted to receive electronic command signals from other electronic devices, such as push-button devices, computer or any type of alternative electronic device known to those of ordinary skill in the art. Control module 209 is operatively connected to the drive train assembly 115 by the standard wires 202 and 204 coupled to the motor 201 and the clutch 203. In addition, the control module 209 is operatively connected by a standard wire 208 to draw wire transducer 113. Further, the control module 209 is operatively connected to the LED display 211, the peripheral communication device 213, the user interface 215 and the power supply 218. Standard wires 214, 216 and 217 connect the LED display 211, peripheral communication device 213 and user interface 215 to the control module 209. The peripheral communication device 213 may be a speaker, such as an audio speaker. User interface 215 next to the peripheral communication device 213 is a standard user interface or it may be a typical graphical user interface. Power supply 218 is a typical external power supply, but this power supply may be an internal power supply, such as a battery located inside the control module assembly 111.

FIG. 3 is an exploded view of the drive train assembly 115 of the automatic refrigerator door control system. Drive train assembly 115, as shown above, includes motor 201 and clutch 203. However, drive train assembly 115 also includes: integrated clamps 300a and 300b, pivot 301, spring 302, mount 303, a motor mount 305, a first shaft coupling 306, a clutch mount 308, a second shaft coupling 309, a front portion wheel mount 310, a wheel 311 and a back portion wheel mount 312. The integrated clamps 300a and 300b are used to secure and easily remove the drive train assembly from the refrigerator door 107. Spring 302 located below the integrated clamps 300a and 300b is attached to the pivot 301. This spring 302 is utilized to exert a normal force on the wheel 311 to force the wheel 311 to contact the surface or floor the refrigerator 100 is placed upon. Front portion wheel mount 310 located next to wheel 311, interacts with the back wheel portion wheel mount 312, second shaft coupling 309, first shaft coupling 308, second shaft coupling 306, clutch 203 and the motor 201 to force the wheel 311 to spin. At the same time, the spring 302 exerts a downward force or normal force that is normal to the contact surface such that a sufficient amount of friction is present between the wheel 311 and the surface so that the wheel 311 does not slip as it is spinning, thus the refrigerator door 107 is able to move effortlessly across the floor. The spring 302 may also be known as a force-producing device that exerts a downward or normal force to produce a sufficient torque.

Figure 4:
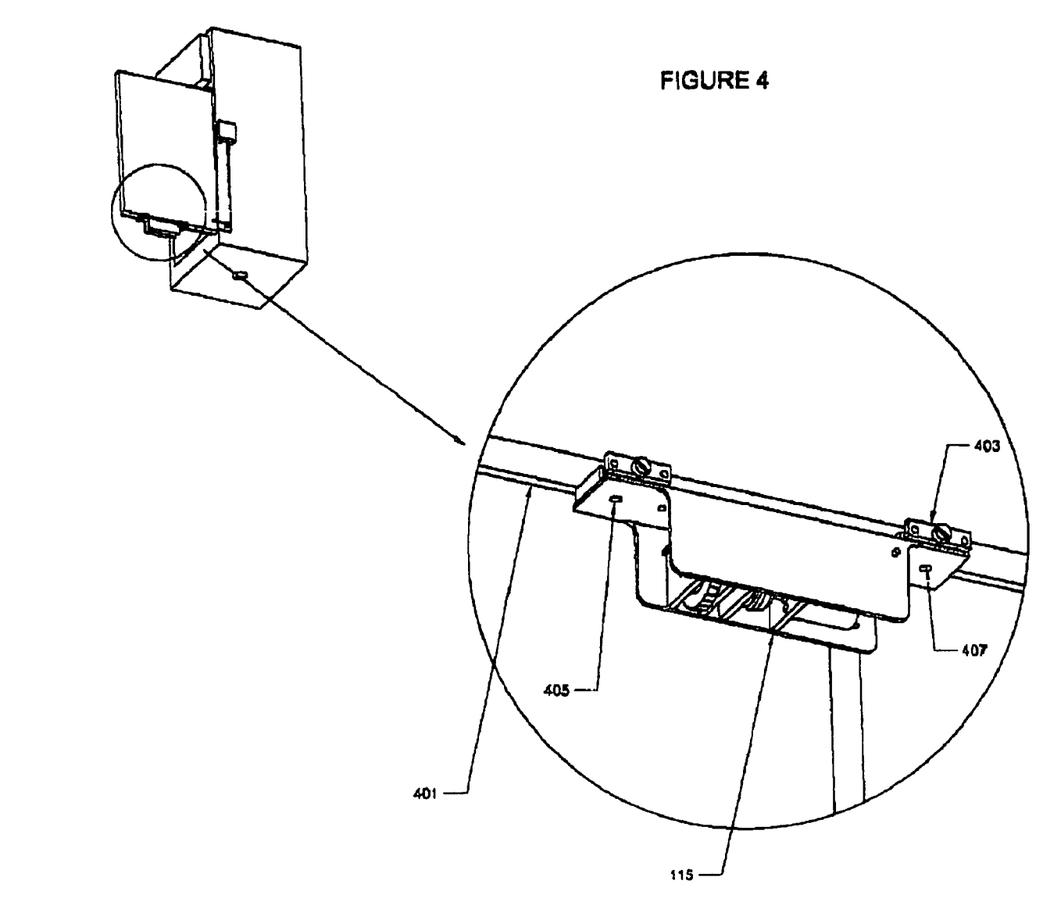
FIG. 4 depicts the drive train assembly of FIG. 3 mounted onto the automatic refrigerator door in accordance with the invention.

FIG. 4 depicts the drive train assembly 115 mounted onto the refrigerator door 107. Drive train assembly 115 is mounted to a holding device 403 on a bottom portion 401 of the refrigerator door 107. Bottom portion 400 interacts with the floor so it enables the drive train assembly 115 to contact the floor or surface of the refrigerator 100 as the refrigerator door 107 is opened or closed. The holding device 403 may be referred to as a bracket that has a plate-like structure that may be made of a metal, such as aluminum, steel or any other metal known to those of ordinary skill in the art. Otherwise, the bracket 403 may be made of a strong plastic, such as polyurethane, any type of strong polymer or any type of strong plastic known to those of ordinary skill in the art. Bracket 403 also includes two openings 405 and 407 utilized to allow the drive train assembly to be mounted onto the bracket 403. The drive train assembly 115 includes two openings that are placed directly below the two openings 405 and 407 of the drive train assembly in order for two threaded studs to be inserted through them and typical fasteners, such as nuts that can secure the drive train assembly 115 to the bracket 403.

Figure 5:
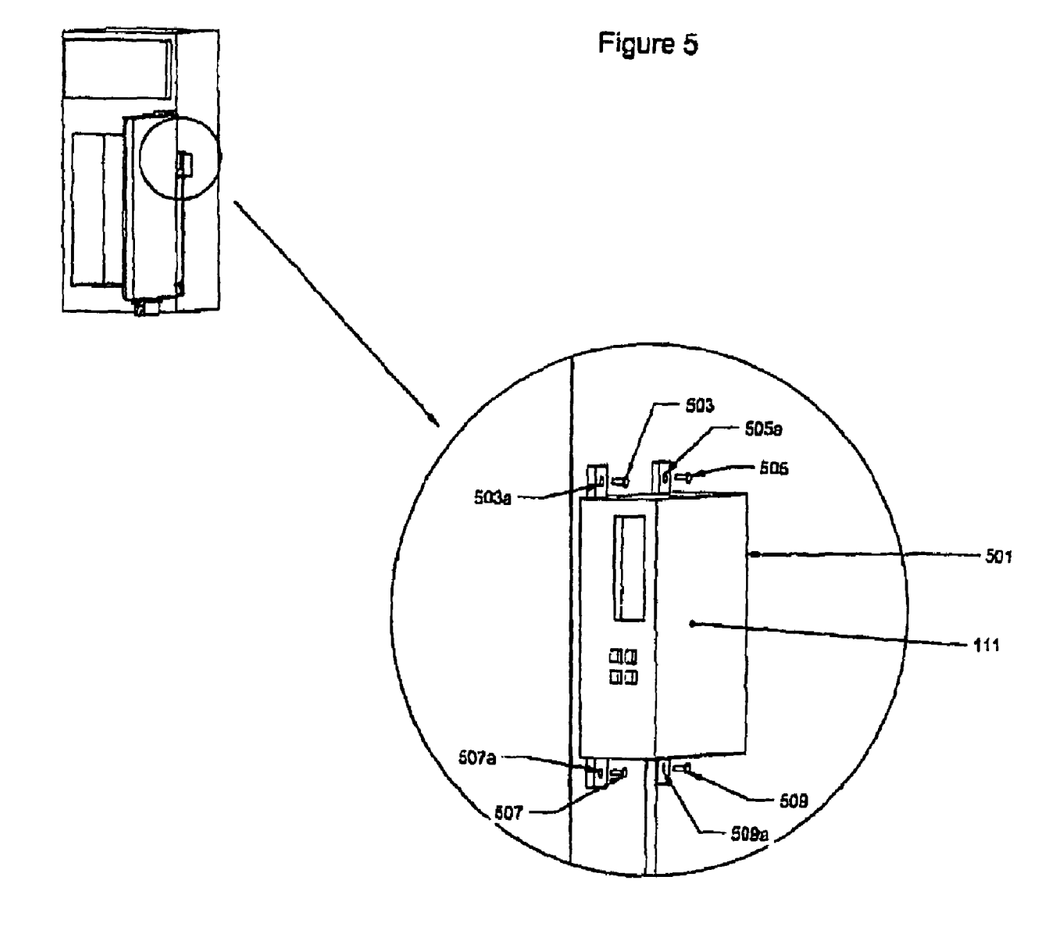
FIG. 5 depicts the control module assembly mounted on the refrigerator in accordance with the invention.

FIG. 5 depicts the control module assembly mounted on the refrigerator. Control module assembly 111 is inside of an enclosure 501 that is mounted on a side of the refrigerator door 107. On the other hand, the enclosure 501 may be mounted on any surface that allows it to contact the drive train assembly 115 and the draw wire transducer 113. Enclosure 501 may be made of rigid material or metal, such as aluminum, steel, copper or any other material known to those of ordinary skill in the art. In an alternative embodiment, enclosure 501 may be made of a hard plastic, such as polyurethane, any type of polymer or any other hard plastic known to those of skill in the art. The enclosure 501 may be coupled to the refrigerator 100 or any surface in any manner, such as by the use of fasteners 503, 505, 507 and 509 inserted through holes 503a, 505a, 507 and 509a in the enclosure 501. However, the enclosures 501 may be secured to the refrigerator by using any fastening or coupling method.

Figure 6:
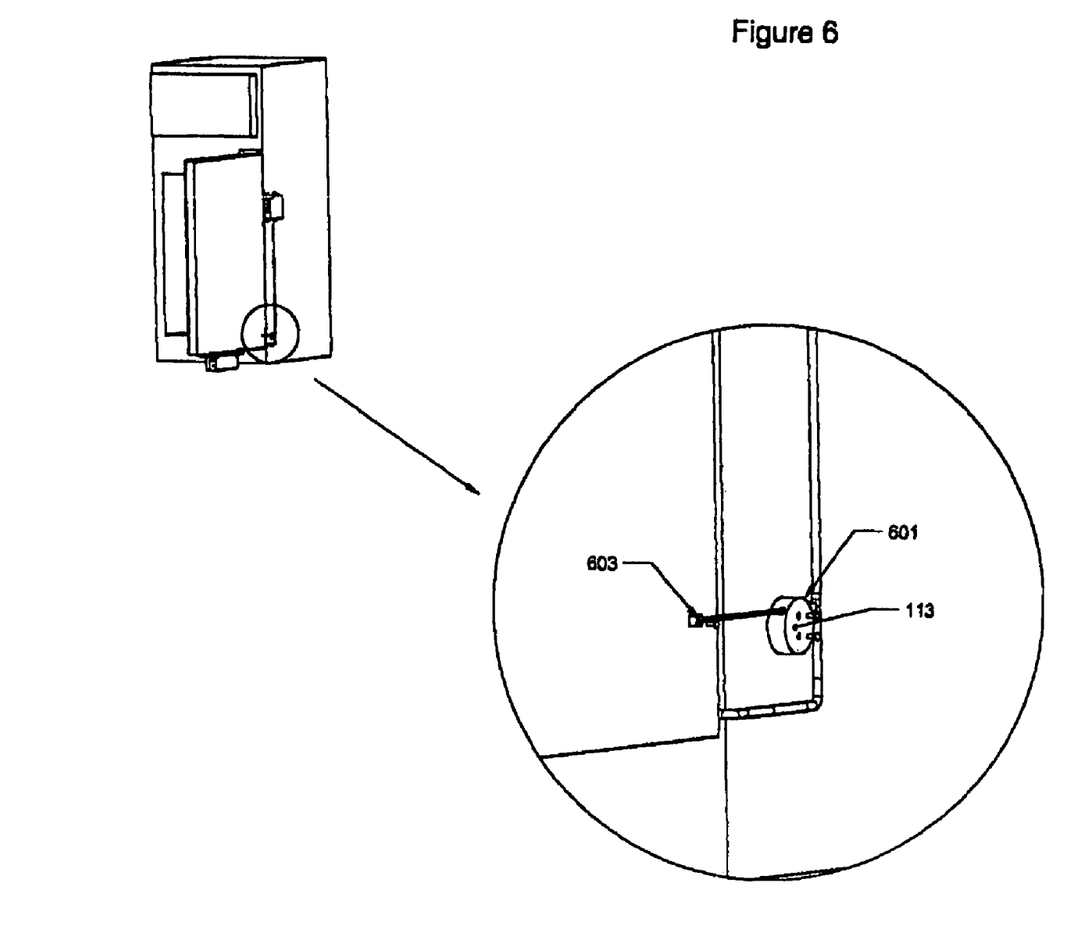
FIG. 6 illustrates the wire-transducer connected to the automatic door control system of FIG. 1 in accordance with the invention.

FIG. 6 illustrates the wire transducer connected to the automatic refrigerator door control system. Wire transducer 113 is a typical wire transducer that outputs a signal in direct proportion to the actuation that it receives from a device, such as the refrigerator door 107. This wire transducer 113 is enclosed in a housing 601. Housing 601 is, preferably, made of a rigid material or metal, such as aluminum, steel, copper or any type of metal known to those of ordinary skill in the art. This housing 601 is attached with fasteners (not shown) to a side of the refrigerator 100 in proximity to where the refrigerator door 107 pivots while a draw wire 603 is attached with fasteners (not shown) to the refrigerator door 107.

Figure 7:
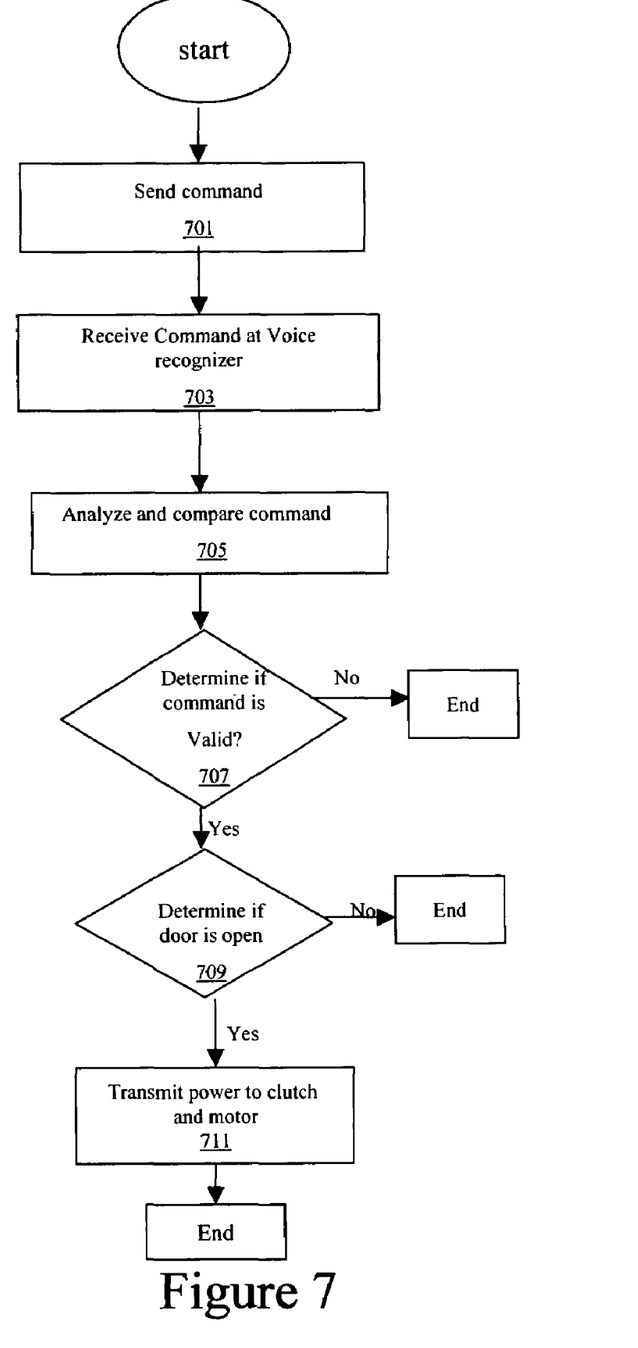
FIG. 7 is a flow chart that shows a method of using the automatic door control system of FIG. 1 in accordance with the invention.

FIG. 7 depicts a flow-chart that shows a method of using the automatic door control system 109. Before the drive train assembly 115 is utilized by the control module assembly 111 to move (open or close) the refrigerator door 107, the amount of force needed to open the refrigerator door 107 must be known to determine the amount of force required by the spring 302 to effortlessly and simply move the wheel 311 across the surface where the refrigerator 100 is placed upon. The weight required to move the refrigerator door 107 is needed to utilize the equation $F_f=nF\times u$, where $F_f$ represents the frictional force or force needed to open the refrigerator door 107, nF represents the normal force exerted on the wheel by the originating force from the spring 302 and u represents the coefficient of friction between the wheel 311 and the surface where the refrigerator 100 is placed upon. Based on the frictional force needed to open the refrigerator door 107 or $F_f$, the normal force of nF will be adjusted as well as the coefficient of friction. For example, if the weight needed to open the refrigerator door 107 ($F_f$) is 20 lbs and the coefficient of friction between the wheel 311 and the surface where the refrigerator 100 is placed upon is 0.2, then 100 lb-in would be the normal force required to easily move the wheel 311 or refrigerator door 107 across the surface. Therefore, based on the given frictional force of $F_f$ needed to open the refrigerator door 107, the coefficient of friction of the wheel 311 and the torsional strength of the spring 302 the wheel 311 can be easily move to simply close and open the refrigerator door 107. In alternative embodiments, the weight of the refrigerator doors 107 are in the range of 10–50 lbs and the coefficient of friction u is in the range of about 0.1 to 1. Thus, based on the weight of the refrigerator door 107, the coefficient of friction between the wheel 311 and the surface and the appropriate spring 302 with the desired force will be determined and utilized to effortlessly move the wheel 311 across the surface where the refrigerator 100 is placed on.

In this flow chart the normal force exerted by the spring 302 on the wheel 311 is 100 lbs, the coefficient of friction is approximately 0.2 based on the weight of 20 lbs required to open the refrigerator door 107. At 701, a command is sent by a user that is in the vicinity of the refrigerator 100 to the automatic door control system 109. For example, the user is in a vicinity of about 1–30 feet from the refrigerator 100 when he says the command "Open" to the refrigerator. The command is also a typical waveform with a sound pattern emitted from a person.

At 703, the microphone 205 at the control module assembly 111 receives the command. Upon receiving the command, microphone 205 transfers the command to the voice recognizer 207. Voice recognizer 207 includes a processor, such as a digital signal processor or microprocessor. This processor includes a stored voice database or sound databases and preset commands database. At 705, when the processor receives the command or waveform it analyzes and compares the command with the stored voice and preset commands databases or databases. At 707, the processor determines if there is a match between the received command and a voice in the stored voice database and the preset commands database. For example, the waveform of the spoken command may match the waveform of the combined voice in the stored database and the preset commands database. The preset commands database are shown in Table 1 as follows:

| Activation Command | Function |
| --- | --- |
| Wake-up | Activates system |
| Open | The door opens |
| Close | The door closes |
| Stop | The door stops |
| Reset | Clears fault status |
| Sleep | Deactivates system |

Besides the commands shown above, there are other commands known to those of ordinary skill in the art that may be utilized by this invention. If the combined waveform of the voice in the stored database and the preset commands database does not match the waveform of the spoken command, then the process ends. However, if the waveform of the spoken command matches with the combined waveform of the voice in the stored voice database and the preset commands database, then the voice recognizer transfers a signal to the control module 209. Control module 209 includes a control processor for controlling the automatic door control system 109.

At 709, the control module 209 is connected to the draw wire transducer assembly 113, which monitors if the refrigerator door 107 to determine if the command has been accomplished. If the draw wire transducer assembly 113 sends a signal that the refrigerator door 107 that the command has been accomplished, then the process ends. However, if the control module 209 receives a signal from the draw wire transducer assembly 113 that the door is closed or the command was not previously sent, then at 711 the control processor activates the drive train assembly by channeling power from the power supply 218 or internal power source to the clutch 203 and motor 201. Clutch 203 and motor 201 are activated to produce a torque of 20 lb-in to enable the wheel 311 to spin or rotate. Clutch 203 and motor 201 utilizes the mount 303, motor mount 305, first shaft coupling, clutch mount 308 and the second wheel shaft coupling to move the wheel 311. The spring 302 applies a normal force of approximately 100 lbs based on the frictional force required to move the refrigerator door 107 to force the wheel 311 to contact the surface or floor where the refrigerator 100 is placed upon so the refrigerator door 107 can effortlessly open or close as the wheel 311 easily glides across the floor.

This invention provides a simple means to allow a person to automatically open or close a door, such as a refrigerator door. Based on the frictional force required to open the door, this system allows a user to effortlessly move the door from an open or closed position. This invention allows a user to easily open or close the door while the user expends a minimum amount of energy.

It is intended that the foregoing detailed description be regarded as illustrative rather than limiting and that it be understood that it is the following claims, including all equivalents, which are intended to define the scope of the invention.

The invention claimed is:

1. An automatic door control system that is operable with a door, the system comprising:
   a control module assembly having:
   a microphone for receiving a voice command;
   a voice recognizer that includes a processor for storing a plurality of waveforms in a voice database and a preset commands database, the voice recognizer comparing the voice command with the voice database and the preset commands database, determining whether the voice command matches the waveforms in the voice database and the present commands database, and generating a signal that corresponds to the voice command if the voice command matches the waveforms stored in the voice database and present commands database; and
   a drive train assembly coupled to the control module assembly and the door, wherein the drive train assembly is configured to receive the signal from the control module assembly to move the door, wherein the drive train assembly is configured to open and close the door; and
   a door position indicator in the form of a draw wire transducer for monitoring the position of the door, the draw wire transducer being operable with the drive train assembly and being configured to transmit and receive signals to/from a control module within the control module assembly, wherein the signals correspond to the voice command.

2. The automatic door control system of claim 1, wherein the drive train assembly uses the force required to move the door with a coefficient of friction between a wheel of the drive train assembly and a surface that the door interacts with to move the door.

3. The automatic door control system of claim 2, wherein the drive train assembly includes a force-producing device.

4. The automatic door control system of claim 3, wherein the following equation is utilized to easily move the door across the surface:

$$F_f = nF * u,$$

wherein $F_f$ represents the force required to open the door, where $nF$ represents a normal force exerted on the wheel by the force-producing device and u represents the coefficient of friction between the wheel and the surface.

5. The automatic door control system of claim 4, wherein $F_f$ is in the range of about 10–50 lbs.

6. The automatic door control system of claim 5, wherein u is in the range of about 0.1 to 1.

7. The automatic door control system of claim 3, wherein the force-producing device is a spring.

8. The automatic door control system of claim 1, wherein the drive train assembly includes:
   a motor that generates torque when the control module assembly generates the signal;
   a clutch that is connected to the motor through the use of a shaft and is adapted to transmit the torque;
   a wheel that receives the torque; and
   a spring for exerting a normal force on the wheel to force the wheel to contact a surface under the door to open and close the door.

9. The automatic door control system of claim 1, wherein the control module assembly further comprises:
   a control module configured to generate the signal for the drive train assembly;
   a light emitting diode display that is communicative with to the control module; and
   an audio speaker that is communicative with the control module.

10. The automatic door control system of claim 9, wherein the control module assembly further comprises a graphical user interface that is communicative with the control module.

* * * * *